US010723964B2

(12) United States Patent
Jakobsson et al.

(10) Patent No.: US 10,723,964 B2
(45) Date of Patent: Jul. 28, 2020

(54) PROCESS FOR ENERGY RECOVERY IN CARBON BLACK PRODUCTION

(71) Applicant: HALDOR TOPSØE A/S, Kgs. Lyngby (DK)

(72) Inventors: Niklas Bengt Jakobsson, Kågeröd (SE); Kurt Agerbæk Christensen, Birkerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 178 days.

(21) Appl. No.: 15/759,558

(22) PCT Filed: Sep. 9, 2016

(86) PCT No.: PCT/EP2016/071264
§ 371 (c)(1),
(2) Date: Mar. 13, 2018

(87) PCT Pub. No.: WO2017/055056
PCT Pub. Date: Apr. 6, 2017

(65) Prior Publication Data
US 2019/0153344 A1    May 23, 2019

(30) Foreign Application Priority Data

Sep. 28, 2015  (DK) .................. 2015 00568

(51) Int. Cl.
| *C10L 3/00* | (2006.01) |
| *B01J 23/22* | (2006.01) |
| *B01D 53/86* | (2006.01) |
| *B01D 53/50* | (2006.01) |
| *B01J 35/04* | (2006.01) |

(52) U.S. Cl.
CPC .............. *C10L 3/00* (2013.01); *B01D 53/507* (2013.01); *B01D 53/508* (2013.01); *B01D 53/869* (2013.01); *B01D 53/8612* (2013.01); *B01J 23/22* (2013.01); *B01J 35/04* (2013.01); B01D 2251/304 (2013.01); B01D 2251/402 (2013.01); B01D 2251/404 (2013.01); B01D 2251/602 (2013.01); B01D 2251/604 (2013.01); B01D 2251/606 (2013.01); B01D 2255/2045 (2013.01); B01D 2255/2047 (2013.01); B01D 2255/2065 (2013.01); B01D 2255/2092 (2013.01); B01D 2255/20723 (2013.01); B01D 2255/20738 (2013.01); B01D 2255/20769 (2013.01); B01D 2255/20776 (2013.01); B01D 2255/30 (2013.01); *C10L 2200/0263* (2013.01); *C10L 2230/04* (2013.01); *C10L 2290/544* (2013.01)

(58) Field of Classification Search
CPC .... B01D 53/52; B01D 53/523; B01D 53/526; B01D 53/8612; B01D 53/8615; B01D 2255/20723; B01D 2257/30; B01D 2257/302; B01D 2257/304
See application file for complete search history.

(56) References Cited

U.S. PATENT DOCUMENTS

| 4,088,743 | A | 5/1978 | Hass et al. |
| 4,169,136 | A | 9/1979 | Hass et al. |
| 4,282,199 | A | 8/1981 | Lamond et al. |
| 6,182,614 | B1 | 2/2001 | Toombs et al. |
| 2006/0228290 | A1 | 10/2006 | Green |

FOREIGN PATENT DOCUMENTS

| CN | 1240498 A | | 1/2000 |
| CN | 2793550 Y | | 5/2006 |
| CN | 102120120 A | * | 7/2011 |
| CN | 202270473 U | | 6/2012 |
| CN | 202638260 U | | 1/2013 |
| CN | 103752135 A | | 4/2014 |
| CN | 104307344 A | | 1/2015 |
| WO | 98/19059 A1 | | 5/1998 |
| WO | WO 03/014015 A1 | | 2/2003 |
| WO | WO 2010/130208 A1 | | 11/2010 |

OTHER PUBLICATIONS

Machine translation of CN-102120120-A, accessed on Jan. 10, 2020. (Year: 2020).*
International Search Report (PCT/ISA/210) dated Nov. 18, 2016, by the European Patent Office as the International Searching Authority for International Application No. PCT/EP2016/071264.
Written Opinion (PCT/ISA/237) dated Nov. 18, 2016, by the European Patent Office as the International Searching Authority for International Application No. PCT/EP2016/071264.
Danish Search Report dated Apr. 28, 2016, by the Danish Patent and Trademark Office.
Office Action (Text of the First Office Action) dated Nov. 27, 2019, by the China National Intellectual Property Administration in corresponding Chinese Patent Application No. 021680052257.9 and an English Translation of the Office Action. (212pages).

* cited by examiner

Primary Examiner — Jonathan R Matthias
(74) Attorney, Agent, or Firm — Buchanan Ingersoll & Rooney P.C.

(57) ABSTRACT

A combustible gas from carbon black production is utilized in a gas engine by adding an oxygen-containing gas to the combustible gas, passing said mixed gas over a selective catalyst, which is active for oxidizing $H_2S$ to $SO_2$ but substantially inactive for oxidation of CO, $H_2$ and other hydrocarbons with less than 4 C-atoms, passing the converted gas through an $SO_2$ removal step, and passing the cleaned gas to a gas engine or to an energy recovery boiler. This way, the tail gas from carbon black production, which is normally combusted in a CO boiler or incinerated, can be utilized to good effect.

10 Claims, No Drawings

PROCESS FOR ENERGY RECOVERY IN CARBON BLACK PRODUCTION

The present invention relates to a process for energy recovery in connection with carbon black production.

Soot is the common word for impure carbon particles resulting from the incomplete combustion of hydrocarbons. It is a powder-like form of amorphous carbon. The gas-phase soots contain polycyclic aromatic hydrocarbons (PAHs). Most properly it is restricted to the product of the gas-phase combustion process, but it is commonly extended to include the residual pyrolyzed fuel particles, such as coal, charred wood, petroleum coke, etc., which may become airborne during pyrolysis and which are more properly identified as cokes or chars.

Soot as an airborne contaminant in the environment has many different sources, all of which are results of some form of pyrolysis. They include soot from coal burning, internal combustion engines, power plant boilers, ship boilers, central steam heat boilers, waste incineration, local field burning, house fires, forest fires, fireplaces, furnaces, etc. The formation of soot depends strongly on the fuel composition. The rank ordering of the tendency of fuel components to produce soot is: naphthalenes→benzenes→aliphatics. This phenomenon is also known as cracking. How-ever, the order of sooting tendencies of the aliphatics (alkanes, alkenes, alkynes) varies dramatically depending on the flame type. The difference between the sooting tendencies of aliphatics and aromatics is thought to result mainly from the different routes of formation.

Aliphatics appear to first form acetylene and polyacetylenes, which is a slow process; aromatics can form soot both by this route and also by a more direct pathway involving ring condensation or polymerization reactions building on the existing aromatic structure.

Carbon black is a specific variant of soot produced by the incomplete combustion of heavy petroleum products like tar, coal tar, ethylene cracking tar, and a small amount from vegetable oil. Carbon black is a form of paracrystalline carbon that has a high surface area-to-volume ratio, albeit lower than that of activated carbon. It is dissimilar to ordinary soot in its much higher surface area-to-volume ratio and significantly lower (negligible as well as non-bioavailable) PAH content. However, carbon black is widely used as a model compound for diesel soot for diesel oxidation experiments. Carbon black is mainly used as a reinforcing filler in tires and other rubber products. In plastics, paints and inks, carbon black is used as a color pigment.

Carbon black is virtually pure elemental carbon in the form of colloidal particles that are produced by incomplete combustion or thermal decomposition of gaseous or liquid hydrocarbons under controlled conditions. Its physical appearance is that of a black, finely divided pellet or powder. Its use in tires, rubber and plastic products, printing inks and coatings is related to properties of specific surface area, particle size and structure, conductivity and color. Carbon black is also in the top 50 industrial chemicals manufactured worldwide, based on annual tonnage. Approximately 90% of carbon black is used in rubber applications, 9% as a pigment, and the remaining 1% as an essential ingredient in hundreds of diverse applications.

Modern carbon black products are direct descendants of early "lamp blacks" first produced by the Chinese over 3,500 years ago. These early lamp blacks were not very pure and differed greatly in their chemical composition from current carbon blacks. Since the mid-1970s, most carbon black has been produced by the oil furnace process, which is most often referred to as furnace black.

Two carbon black manufacturing processes (furnace black and thermal black) produce nearly all of the world's carbon blacks, with the furnace black process being the most common. The furnace black process uses heavy aromatic oils as feedstock. The production furnace uses a closed reactor to atomize the feedstock oil under carefully controlled conditions (primarily temperature and pressure). The primary feedstock is introduced into a hot gas stream (achieved by burning a secondary feedstock, e.g., natural gas or oil) where it vaporizes and then pyrolyzes in the vapour phase to form microscopic carbon particles. In most furnace reactors, the reaction rate is controlled by steam or water sprays. The carbon black produced is conveyed through the reactor, cooled, and collected in bag filters in a continuous process. Residual gas, or tail gas, from a furnace reactor includes a variety of gases such as carbon monoxide and hydrogen. Most furnace black plants use a portion of this residual gas to produce heat, steam or electric power.

The thermal black process uses natural gas, consisting primarily of methane, or heavy aromatic oils as feedstock material. The process uses a pair of furnaces that alternate approximately every five minutes between pre-heating and carbon black production. The natural gas is injected into the hot refractory lined furnace, and, in the absence of air, the heat from the refractory material decomposes the natural gas into carbon black and hydrogen. The aerosol material stream is quenched with water sprays and filtered in a bag house. The exiting carbon black may be further processed to remove impurities, pelletized, screened, and then packaged for shipment. The hydrogen off-gas is burned in air to preheat the second furnace.

Carbon black is not soot or black carbon, which are the two most common, generic terms applied to various unwanted carbonaceous by-products resulting from the incomplete combustion of carbon-containing materials, such as oil, fuel oils or gasoline, coal, paper, rubber, plastics and waste material. Soot and black carbon also contain large quantities of dichloromethane- and toluene-extractable materials, and can exhibit an ash content of 50% or more.

Carbon black is chemically and physically distinct from soot and black carbon, with most types containing greater than 97% elemental carbon arranged as aciniform (grape-like cluster) particulate. On the contrary, typically less than 60% of the total particle mass of soot or black carbon is composed of carbon, depending on the source and characteristics of the particles (shape, size, and heterogeneity). In the case of commercial carbon blacks, organic contaminants such as polycyclic aromatic hydrocarbons (PAHs) can only be extracted under very rigorous laboratory analytical procedures (solvent extraction using organic solvents and high temperatures). However, these extracts, though they may be similar to those derived from soot, are unique, because carbon black extracts exist only in extremely small quantities. Water and body fluids are ineffective in removing PAHs from the surface of carbon black and, therefore, they are not considered to be biologically available. Two other commercial carbonaceous products often confused with carbon black are activated carbon and bone black. Each is produced by processes different from commercial carbon black and possesses unique physical and chemical properties.

This invention has its basis in carbon black production by the furnace black method. More specifically, it concerns the tail gas from carbon black production. Said tail gas typically leaves the bag filter at 200-260° C., and it is normally combusted in a CO boiler or incinerated, because this reducing gas cannot be sent directly to the atmosphere.

It is well-known to utilize the tail gas from carbon black production, not only because it cannot be sent to the atmosphere, but also because it has useful properties which can be exploited. Thus, Chinese utility model application CN 2793550 Y discloses a boiler, which is fuelled by carbon black tail gas to generate power or supply heat. It is stated in the application that the boiler can reduce the environmental pollution caused by the carbon black tail gas and at the same time raise the efficiency of energy utilization and reduce the power consumption in manufacture.

U.S. Pat. No. 6,182,614 B1 describes a system and a process for utilizing tail gas from a carbon black manufacturing process as a fuel in a reciprocating engine. The tail gas is dewatered and mixed with air to form a fuel gas, which is pressure charged and then ignited in the reciprocating engine to derive useful work.

In WO 2010/130208 A1 a method for producing carbon black by cracking feed oil is described. The method includes cooling the carbon black tail gas, from which the carbon black product has been separated, so as to condense water in the tail gas. After removal of the condensed water, the tail gas is pre-heated and sent to the carbon black combustion room to partly replace fuel oil in supplying heat for the cracking reaction. Thus, the method can reduce the fuel oil consumption in the carbon black production process.

U.S. Pat. No. 4,282,199 B1 discloses a carbon black process, in which the tail gas generated in the process can be used as a source of fuel for drying carbon black without adversely affecting the product properties of the end product if the dried carbon black is heat treated using a fuel devoid of sulfur and nitrogen compounds.

Because of the reducing atmosphere and the high temperature in the reactor, the tail gas, which consists of 25-40 vol % water vapor, 40-50 vol % nitrogen and 3-5 vol % carbon dioxide, also contains a certain amount of combustible gases, the amount of which depends on the feedstock and the processing conditions. These gases typically include 5-10 vol % carbon monoxide, 5-10 vol % hydrogen, ammonia and small amounts of methane and other hydrocarbons. Ammonia is very soluble in water and may be removed in a scrubber. The lower heating value is typically between 1700 and 2100 kJ/m³. The residual carbon black content in the off-gas is normally less than 10 mg/m³, and the gas also contains some $H_2S$. In some cases, part of the heating value of the gas is recovered as steam or as electricity in the CO boiler.

More electricity can be produced from the combustible tail gas in a gas engine. However, a gas engine cannot accept more than typically 20-300 ppm sulfur compounds in the feed depending on the heating value of the feed gas. For a specific gas engine tested by the applicant the limit appears to be 54 ppm sulfur. If there is a CO oxidation catalyst present, the limit drops to 15 ppm sulfur because of $SO_3$ formation on such (noble metal) catalyst. In case of a higher heating value of the feed gas, the maximum allowable sulfur content in the feed gas increases proportionally.

The idea underlying the present invention is to use a specific catalyst that only oxidizes $H_2S$ to $SO_2$ and then subsequently remove the $SO_2$ in an alkaline scrubber before passing the gas to the gas engine. The heating value of the gas is maintained because the catalyst is selective with a very low oxidation rate for $H_2$, CO and hydrocarbons. Additionally, if a monolithic type catalyst is used, the monolithic shape is not susceptible to plugging by the small amount of residual carbon black particulates due to the straight channels of the monolith. The monolith also secures a low pressure drop.

Thus, the present invention relates to a novel method for utilization of a combustible gas from carbon black production in a gas engine, said method comprising the steps of
(a) adding an oxygen-containing gas to the combustible gas in an amount corresponding to an $O_2$ content of 0.5-5%, preferably 0.5-3% and most preferably 1-2% in the outlet,
(b) passing said mixed gas over a selective catalyst, which is active for oxidizing $H_2S$ to $SO_2$ but substantially inactive for oxidation of CO, $H_2$ and other hydrocarbons with less than 4 C-atoms,
(c) passing the converted gas from step (b) through an $SO_2$ removal step, and
(d) passing the cleaned gas from step (c) to a gas engine.

Alternatively, the cleaned gas from step (c) may be passed to an energy recovery boiler.

The $SO_2$ removal step mentioned under (c) above can be carried out by using a wet scrubber and an alkaline reagent, such as NaOH, KOH or $NH_3$, or an oxidative reagent, such as $H_2O_2$, or combinations thereof.

The $SO_2$ removal step mentioned under (c) above can also be carried out by using a dry scrubber and an alkaline sorbent, such as CaO, $CaCO_3$, $Ca(OH)_2$, $Mg(OH)_2$, MgO, sodium bisulfite, sodium sesquicarbonate or sodium bicarbonate, or combinations thereof.

The selective catalyst preferably consists of one or more metal oxides, in which the metal is selected from the group consisting of V, W, Ce, Mo, Fe, Ca and Mg, and one or more supports taken from the group consisting of $Al_2O_3$, $SiO_2$, SiC and $TiO_2$, optionally in the presence of other elements in a concentration below 1 wt %. It is especially preferred that the selective catalyst comprises from 1 wt %, 2 wt % or 3 wt % to 4 wt %, 5 wt %, 10 wt %, 25 wt % or 50 wt % $V_2O_5$.

The selective catalyst is advantageously integrated inside the wall of a ceramic candle dust filter or a fabric dust filter bag.

The selective catalyst can be a monolithic type catalyst, which can also be used with the purpose of avoiding plugging in the system.

A monolithic type catalyst is a corrugated fibrous monolith substrate coated with a supporting oxide. It is preferably coated with $TiO_2$ and subsequently impregnated with $V_2O_5$ and/or $WO_3$. The channel diameter of the corrugated monolith is between 1 and 8 mm, preferably around 2.7 mm. The wall thickness of the corrugated monolith is between 0.1 and 0.8 mm, preferably around 0.4 mm. This catalyst can be manufactured from various ceramic materials used as a carrier, such as titanium oxide, and active catalytic components are usually either oxides of base metals (such as vanadium, molybdenum and tungsten), zeolites, or various precious metals. Catalysts of monolithic structure are known to provide a favourable performance with respect to selectivity when the desired reaction is fast and any undesired reaction is slow. This is also the case in the present invention, where the conversion of $H_2S$ to $SO_2$ is a fast reaction that benefits from the high surface area.

The maximum ammonia content in the feed gas to a specific gas engine tested by the applicant has been calculated to be around 7 ppm, which also increases with increasing heating value of the feed gas. As already mentioned, ammonia is very soluble in water and may be removed in a scrubber. The equilibrium vapor pressure over a 0.2 mol/l $NH_4^+$ liquid at 40° C. and pH 6 has been calculated to be 5 ppm $NH_3$ (and 12 ppm $SO_2$ if it is an ammonium sulfite scrubber). If a scrubber is to capture both $SO_2$ and $NH_3$, then pH must be around 6. As an alternative, $H_2O_2$ (which oxidizes $SO_2$ to $H_2SO_4$) may be added, whereby it is possible to obtain a much larger window of operation.

The following example illustrates calculations regarding the scrubber in three cases: One with NaOH in the feed, one with NaOH and $H_2O_2$ in the feed and one with only $H_2O_2$ in the feed.

EXAMPLE

According to the method of the invention, a carbon black tail gas containing 400 ppm $NH_3$ and 2000 ppm $H_2S$ with added air is passed over a selective catalyst. The effluent from the catalyst, containing 400 ppm $NH_3$ and 2000 ppm $SO_2$ is fed to a scrubber. Three different feed scenarios are considered as shown in Table 1 below.

TABLE 1

| Feed stream to scrubber | | | |
|---|---|---|---|
| | scenario | | |
| | 1 | 2 | 3 |
| Temperature | 40° C. | 40° C. | 40° C. |
| Pressure | 1 atm | 1 atm | 1 atm |
| Flow (Nm³/h) | 10000 | 10000 | 10000 |
| NaOH (kmol/h) | 0.8 | 1.55 | 0 |
| $H_2O_2$ (kmol/h) | 0 | 0.83 | 0.89 |
| $H_2O$ (kg/h) | 1500 | 400 | 100 |

In the calculation with $H_2O_2$ without any NaOH (scenario 3) it has been assumed that all $SO_2$ is oxidized to $H_2SO_4$. In reality, a surplus of $H_2O_2$ is required. This will lead to a very acidic liquid and an equilibrium partial pressure for $SO_2$ and $NH_3$ around 0. In practice, a few ppm $SO_2$ will most likely remain, dependent on $H_2O_2/SO_2$ ratio and contact efficiency.

In the scrubber, NaOH and/or $H_2O_2$ is added at pH around 6. The liquid effluent from the scrubber contains salts, i.e. ions ($NH_4^+$, $Na^+$, $HSO_3^-$, $SO_3^{2-}$, $HSO_4^-$, $SO_4^{2-}$), in water. The emissions from the scrubber are $SO_2$ and $NH_3$. Regarding the $NH_3$ emissions it is noted that at pH<1, the equilibrium vapour pressure is practically 0. The actual value depends on the scrubber design.

The calculated results are summarized in Table 2.

TABLE 2

| Liquid effluent and emissions | | | |
|---|---|---|---|
| | scenario | | |
| | 1 | 2 | 3 |
| Liquid effluent | | | |
| liquid (kg/h) | 1594 | 523 | 189 |
| salts (wt %) | 5.9 | 23.6 | 47.1 |
| pH | 6.23 | 5.75 | <1 |
| Emissions | | | |

TABLE 2-continued

| Liquid effluent and emissions | | | |
|---|---|---|---|
| | scenario | | |
| | 1 | 2 | 3 |
| $SO_2$ (ppm) | 20.9 | 17.2 | 20 |
| $NH_3$ (ppm) | 5.3 | 5.4 | 5 |

The invention claimed is:

1. A method for utilization of a combustible gas from carbon black production in a gas engine, said method comprising the steps of
   (a) adding an oxygen-containing gas to the combustible gas in an amount corresponding to an $O_2$ content of 0.5-5% in an outlet of a carbon black production facility,
   (b) passing said mixed gas over a selective catalyst, which is active for oxidizing $H_2S$ to $SO_2$ but substantially inactive for oxidation of CO, $H_2$ and other hydrocarbons with less than 4 C-atoms,
   (c) passing the converted gas from step (b) through an $SO_2$ removal step, and
   (d) passing the cleaned gas from step (c) to a gas engine.

2. The method according to claim 1, wherein the cleaned gas from step (c) is passed to an energy recovery boiler.

3. The method according to claim 1, wherein the selective catalyst consists of one or more metal oxides, in which the metal is selected from the group consisting of V, W, Ce, Mo, Fe, Ca and Mg, and one or more supports taken from the group consisting of $Al_2O_3$, $SiO_2$, SiC and $TiO_2$, optionally in the presence of other elements in a concentration below 1 wt %.

4. The method according to claim 3, wherein the selective catalyst comprises from 1 wt % to 50 wt % $V_2O_5$.

5. The method according to claim 1, wherein a monolithic type catalyst is used with the further purpose of avoiding plugging in the system.

6. The method according to claim 1, wherein the selective catalyst is integrated inside the wall of a ceramic candle dust filter.

7. The method according to claim 1, wherein the selective catalyst is integrated inside the wall of a fabric dust filter bag.

8. The method according to claim 1, wherein said $SO_2$ removal step is carried out by using a wet scrubber and an alkaline reagent, an oxidative reagent, or combinations thereof.

9. The method according to claim 8, wherein said $SO_2$ removal step is carried out by using a dry scrubber and an alkaline sorbent.

10. The method according to claim 1,
   wherein said $SO_2$ removal step is carried out by using a wet scrubber and an alkaline reagent, an oxidative reagent, or combinations thereof, or
   wherein said $SO_2$ removal step is carried out by using a dry scrubber and an alkaline sorbent.

* * * * *